United States Patent
Zhang et al.

(10) Patent No.: US 9,323,554 B2
(45) Date of Patent: Apr. 26, 2016

(54) METHOD, DEVICE, AND SYSTEM FOR MIGRATING CONFIGURATION INFORMATION DURING LIVE MIGRATION OF VIRTUAL MACHINE

(71) Applicant: Huawei Technologies Co., Ltd., Shenzhen (CN)

(72) Inventors: Zhe Zhang, Shenzhen (CN); Xiaofeng Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 14/028,073

(22) Filed: Sep. 16, 2013

(65) Prior Publication Data

US 2014/0130044 A1 May 8, 2014

(30) Foreign Application Priority Data

Nov. 7, 2012 (CN) .......................... 2012 1 0440895

(51) Int. Cl.
| | |
|---|---|
| *G06F 9/46* | (2006.01) |
| *G06F 9/455* | (2006.01) |
| *G06F 9/48* | (2006.01) |
| *G06F 9/50* | (2006.01) |

(52) U.S. Cl.
CPC .......... *G06F 9/45533* (2013.01); *G06F 9/4856* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 2009/0064136 A1 | 3/2009 | Dow et al. | |
| 2009/0240790 A1* | 9/2009 | Utsunomiya | H04L 12/4645 709/221 |
| 2011/0238820 A1* | 9/2011 | Matsuoka | 709/224 |
| 2012/0096460 A1 | 4/2012 | Sekiguchi et al. | |

FOREIGN PATENT DOCUMENTS

WO 2011057874 A2 5/2011

OTHER PUBLICATIONS

Wikipedia, the free encyclopedia, "DHCP Snooping," http://en.wikipedia.org/wiki/DHCP_Snooping, Dec. 4, 2013, 2 pages.
Wikipedia, the free encyclopedia, "Live Migration," http://en.wikipedia.org/wiki/Live_migration, Dec. 4, 2013, 4 pages.

(Continued)

*Primary Examiner* — Wissam Rashid
(74) *Attorney, Agent, or Firm* — Slater & Matsil, L.L.P.

(57) ABSTRACT

The present disclosure discloses a method for migrating configuration information during live migration of a virtual machine. After receiving a message of live migration that a virtual machine migrates from a source physical host to a target physical host sent by a virtual machine management server, an identifier of a source forwarding switch of the virtual machine and an identifier of a target forwarding switch of the virtual machine are acquired. Prestored configuration information is sent to the target forwarding switch corresponding to the identifier of the target forwarding switch, so that the target forwarding switch stores the configuration information. A configuration information deletion instruction is sent to the source forwarding switch corresponding to the identifier of the source forwarding switch, so that the source forwarding switch deletes the prestored configuration information.

19 Claims, 8 Drawing Sheets

(56) References Cited

OTHER PUBLICATIONS

Pfaff, Ben et al. "OpenFlow Switch Specification," Version 1.1.0 Implemented (Wire Protocol 0x02), Feb. 28, 2011, 56 pages.
Clark, C. et al., "Live Migration of Virtual Machines," NSDI '05: 2nd Symposium on Networked Systems Designs & Implementation, Apr. 5, 2005, 14 pages.
Extended European Search Report received in Application No. 13184572.9-1957 mailed Feb. 27, 2014, 6 pages.
Liu, H. et al., "Live Virtual Machine Migration via Asynchronous Replication and State Synchronization," IEEE Transactions on Parallel and Distributed Systems, vol. 22, No. 12, Dec. 2011, 14 pages.

\* cited by examiner

METHOD, DEVICE, AND SYSTEM FOR MIGRATING CONFIGURATION INFORMATION DURING LIVE MIGRATION OF VIRTUAL MACHINE

CROSS-REFERENCE TO RELATED APPLICATION

This application claims priority to Chinese Patent Application No. 201210440895.1, filed on Nov. 7, 2012, which is hereby incorporated by reference in its entirety.

TECHNICAL FIELD

The present disclosure relates to the field of communications technologies, and in particular to a method, a device, and a system for migrating configuration information during live migration of a virtual machine.

BACKGROUND

Live migration of a virtual machine means that a virtual machine in a running state migrates from one physical host to another physical host.

To maintain secure running of a virtual machine, for each virtual machine, a dynamic host configuration protocol snooping (DHCP SNOOPING, Dynamic Host Configuration Protocol SNOOPING) binding table needs to be stored on a forwarding switch that controls the virtual machine, where the binding table records configuration information required for live migration of the virtual machine. Unreliable DHCP configuration information is filtered out by using the binding table, thereby ensuring secure running of the virtual machine.

A DHCP SNOOPING feature is incompatible with a mechanism of live migration of a virtual machine; when live migration occurs, a virtual machine itself cannot sense the live migration, and therefore the virtual machine to which the live migration occurs does not actively initiate a DHCP procedure; after the virtual machine migrates to another physical host, no DHCP SNOOPING binding table is stored on a forwarding switch that controls the physical host; and in this case, after the live migration, the virtual machine is online on a new physical host, which is identified as an Internet protocol/media access control (IP/MAC, Internet Protocol/Media Access Control) address forgery attack, thereby causing that the virtual machine fails to access a network.

SUMMARY

An embodiment of the present disclosure provides a method for migrating configuration information during live migration of a virtual machine, so that configuration information of a virtual machine can be migrated synchronously during live migration of the virtual machine, which enables the virtual machine to access a network successfully after the live migration. Embodiments of the present disclosure further provide a corresponding apparatus and system.

In a first aspect, an embodiment of the present disclosure provides a method for migrating configuration information during live migration of a virtual machine, including:

after receiving a message of live migration that a virtual machine migrates from a source physical host to a target physical host sent by a virtual machine management server, acquiring an identifier of a source forwarding switch of the virtual machine and an identifier of a target forwarding switch of the virtual machine;

sending prestored configuration information to the target forwarding switch corresponding to the identifier of the target forwarding switch, so that the target forwarding switch stores the configuration information; and sending a configuration information deletion instruction to the source forwarding switch corresponding to the identifier of the source forwarding switch, so that the source forwarding switch deletes the prestored configuration information.

In combination with the first aspect, in a first possible implementation manner, the message of the live migration carries an identifier of the virtual machine to which the live migration occurs and an identifier of the target physical host to which the virtual machine migrates, and the acquiring an identifier of a source forwarding switch of the virtual machine and an identifier of a target forwarding switch of the virtual machine specifically includes:

determining the identifier of the source forwarding switch according to the identifier of the virtual machine; and determining the identifier of the target forwarding switch according to the identifier of the target physical host.

In combination with the first aspect, in a second possible implementation manner, the message of the live migration carries an identifier of the virtual machine to which the live migration occurs and an identifier of a target forwarding switch corresponding to the target physical host to which the virtual machine migrates, and the acquiring an identifier of a source forwarding switch of the virtual machine and an identifier of a target forwarding switch of the virtual machine specifically includes:

determining the identifier of the source forwarding switch according to the identifier of the virtual machine.

In combination with the first aspect and the first or second possible implementation manner of the first aspect, in a third possible implementation manner, before the step of receiving a message of live migration that a virtual machine migrates from a source physical host to a target physical host sent by a virtual machine management server, the method further includes:

creating and storing configuration information; and sending the configuration information to the source forwarding switch.

In combination with the first aspect and the first or second possible implementation manner of the first aspect, in a fourth possible implementation manner, before the step of receiving a message of live migration that a virtual machine migrates from a source physical host to a target physical host sent by a virtual machine management server, the method further includes:

receiving and storing configuration information created by the source forwarding switch.

In combination with the first aspect and the first or second possible implementation manner of the first aspect, in a fifth possible implementation manner, before the step of receiving a message of live migration that a virtual machine migrates from a source physical host to a target physical host sent by a virtual machine management server, the method further includes:

receiving configuration information of the virtual machine sent by the virtual machine management server, and sending the configuration information of the virtual machine to the source forwarding switch.

In combination with the fifth possible implementation manner of the first aspect, in a sixth possible implementation manner, after the step of receiving a message of live migration that a virtual machine migrates from a source physical host to a target physical host sent by a virtual machine management server, the method further includes:

receiving and storing updated configuration information that is sent by the virtual machine management server after the live migration of the virtual machine; and the sending prestored configuration information to the target forwarding switch corresponding to the identifier of the target forwarding switch specifically includes:

sending the updated configuration information to the target forwarding switch.

In a second aspect, an embodiment of the present disclosure provides a switching control apparatus, including:

a receiving unit, configured to receive a message of live migration that a virtual machine migrates from a source physical host to a target physical host sent by a virtual machine management server;

an acquiring unit, configured to acquire an identifier of a source forwarding switch of the virtual machine and an identifier of a target forwarding switch of the virtual machine after the receiving unit receives the message of the live migration of the virtual machine; and a sending unit, configured to send prestored configuration information to the target forwarding switch corresponding to the identifier of the target forwarding switch, where the identifier of the target forwarding switch is acquired by the acquiring unit, so that the target forwarding switch stores the configuration information; and send a configuration information deletion instruction to the source forwarding switch corresponding to the identifier of the source forwarding switch, so that the source forwarding switch deletes the prestored configuration information.

In combination with the second aspect, in a first possible implementation manner, the message of the live migration carries an identifier of the virtual machine to which the live migration occurs and an identifier of the target physical host to which the virtual machine migrates, and the acquiring unit is specifically configured to determine the identifier of the source forwarding switch according to the identifier of the virtual machine and determine the identifier of the target forwarding switch according to the identifier of the target physical host.

In combination with the second aspect, in a second possible implementation manner, the message of the live migration carries an identifier of the virtual machine to which the live migration occurs and an identifier of a target forwarding switch corresponding to the target physical host to which the virtual machine migrates, and the acquiring unit is specifically configured to determine the identifier of the source forwarding switch according to the identifier of the virtual machine.

In combination with the second aspect and the first or second possible implementation manner of the second aspect, in a third possible implementation manner, the switching control apparatus further includes: a creating unit and a first storing unit, where:

the creating unit is configured to create configuration information;

the first storing unit is configured to store the configuration information created by the creating unit; and the sending unit is further configured to send, to the source forwarding switch, the configuration information stored by the first storing unit.

In combination with the second aspect and the first or second possible implementation manner of the second aspect, in a fourth possible implementation manner, the switching control apparatus further includes: a second storing unit, where:

the receiving unit is further configured to receive configuration information created by the source forwarding switch; and the second storing unit is configured to store the configuration information received by the receiving unit.

In combination with the second aspect and the first or second possible implementation manner of the second aspect, in a fifth possible implementation manner:

the receiving unit is further configured to receive configuration information of the virtual machine sent by the virtual machine management server; and the sending unit is further configured to send, to the source forwarding switch, the configuration information of the virtual machine received by the receiving unit.

In combination with the fifth possible implementation manner, in a sixth possible implementation manner:

the receiving unit is further configured to receive updated configuration information that is sent by the virtual machine management server after the live migration of the virtual machine; and the sending unit is further configured to send, to the target forwarding switch, the updated configuration information received by the receiving unit.

In a third aspect, an embodiment of the present disclosure provides a computer storage medium, where the computer storage medium stores a program, and when the program is executed, a part or all of the steps in the information configuration method are performed.

In a fourth aspect, an embodiment of the present disclosure provides a switching control device, including: an input apparatus, an output apparatus, a memory, and a processor, where:

the input apparatus is configured to receive a message of live migration that a virtual machine migrates from a source physical host to a target physical host sent by a virtual machine management server;

the processor is configured to acquire an identifier of a source forwarding switch of the virtual machine and an identifier of a target forwarding switch of the virtual machine; and the output apparatus is configured to send prestored configuration information to the target forwarding switch corresponding to the identifier of the target forwarding switch, so that the target forwarding switch stores the configuration information; and send a configuration information deletion instruction to the source forwarding switch corresponding to the identifier of the source forwarding switch, so that the source forwarding switch deletes the prestored configuration information.

In combination with the fourth aspect, in a first possible implementation manner, the message of the live migration carries an identifier of the virtual machine to which the live migration occurs and an identifier of the target physical host to which the virtual machine migrates, and the processor is configured to determine the identifier of the source forwarding switch according to the identifier of the virtual machine and determine the identifier of the target forwarding switch according to the identifier of the target physical host.

In combination with the fourth aspect, in a second possible implementation manner, the message of the live migration carries an identifier of the virtual machine to which the live migration occurs and an identifier of a target forwarding switch corresponding to the target physical host to which the virtual machine migrates, and the processor is configured to determine the identifier of the source forwarding switch according to the identifier of the virtual machine.

In combination with the fourth aspect and the first or second possible implementation manner of the fourth aspect, in a third possible implementation manner:

the processor is further configured to create configuration information;

the memory is further configured to store the configuration information; and the output apparatus is further configured to send the configuration information to the source forwarding switch.

In combination with the fourth aspect and the first or second possible implementation manner of the fourth aspect, in a fourth possible implementation manner:

the input apparatus is further configured to receive configuration information created by the source forwarding switch; and the memory is further configured to store the configuration information.

In combination with the fourth aspect and the first or second possible implementation manner of the fourth aspect, in a fifth possible implementation manner:

the input apparatus is further configured to receive configuration information of the virtual machine sent by the virtual machine management server; and the output apparatus is further configured to send the configuration information of the virtual machine to the source forwarding switch.

In combination with the fifth possible implementation manner, in a sixth possible implementation manner, the input apparatus is further configured to receive updated configuration information that is sent by the virtual machine management server after the live migration of the virtual machine; and the output apparatus is further configured to send the updated configuration information to the target forwarding switch.

In a fifth aspect, an embodiment of the present disclosure provides a virtual network system, including: a virtual machine, a physical host, a forwarding switch, a virtual machine management server, and a switching control apparatus, where the physical host communicates with the virtual machine management server through an H1 interface, the forwarding switch communicates with the switching control apparatus through a C1 interface, and the virtual machine management server communicates with the switching control apparatus through an I1 interface;

the virtual machine runs on the physical host, the virtual machine management server manages the virtual machine, and the forwarding switch supports running of the virtual machine; and the switching control apparatus is the switching control apparatus in the foregoing technical solution.

In the embodiments of the present disclosure, after a message of live migration that a virtual machine migrates from a source physical host to a target physical host sent by a virtual machine management server is received, an identifier of a source forwarding switch of the virtual machine and an identifier of a target forwarding switch of the virtual machine are acquired; prestored configuration information is sent to the target forwarding switch corresponding to the identifier of the target forwarding switch, so that the target forwarding switch stores the configuration information; and a configuration information deletion instruction is sent to the source forwarding switch corresponding to the identifier of the source forwarding switch, so that the source forwarding switch deletes the prestored configuration information. Compared with the prior art in which configuration information is not migrated synchronously after live migration of a virtual machine, with the method for migrating configuration information during live migration of a virtual machine provided in the embodiments of the present disclosure, configuration information of a virtual machine can be migrated synchronously during live migration of the virtual machine. In this way, when the virtual machine is online on a new physical host, it is not identified as an Internet protocol/media access control address forgery attack, thereby enabling the virtual machine to access a network successfully after the live migration.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

An embodiment of the present disclosure provides a method for migrating configuration information during live migration of a virtual machine, so that configuration information of a virtual machine can be migrated synchronously during live migration of the virtual machine, which enables the virtual machine to access a network successfully after the live migration. Embodiments of the present disclosure further provide a corresponding apparatus and system, which are described in detail in the following.

The following clearly describes the technical solutions in the embodiments of the present disclosure with reference to the accompanying drawings in the embodiments of the present disclosure. Apparently, the embodiments to be described are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
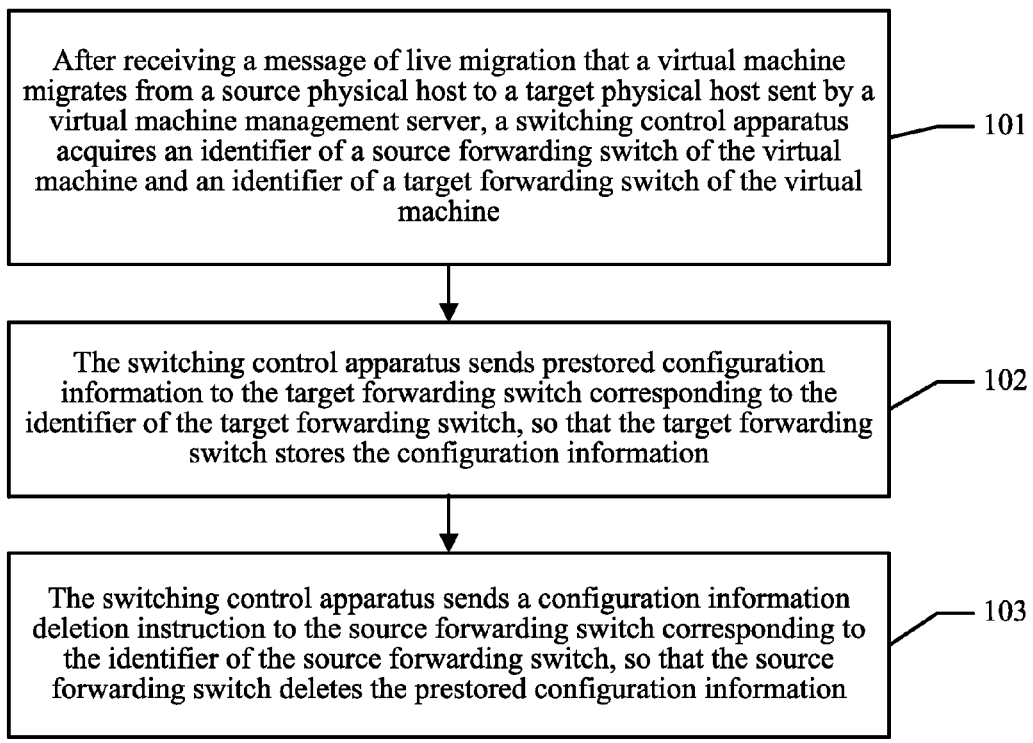
FIG. 1 is a schematic diagram of an embodiment of a method according to the present disclosure.

Referring to FIG. 1, an embodiment of a method for migrating configuration information during live migration of a virtual machine provided in embodiment of the present disclosure includes:

101. After receiving a message of live migration that a virtual machine migrates from a source physical host to a target physical host sent by a virtual machine management server, a switching control apparatus acquires an identifier of a source forwarding switch of the virtual machine and an identifier of a target forwarding switch of the virtual machine.

After the virtual machine migrates from the source physical host to the target physical host, the virtual machine management server detects a live migration event through communication interfaces between the virtual machine management server and the physical hosts, where the communication interfaces between the virtual machine management server and the physical hosts may be H1 interfaces. After detecting that live migration occurs to the virtual machine, the virtual machine management server sends a message of the live migration of the virtual machine to the switching control apparatus through a communication interface between the virtual machine management server and the switching control apparatus, where the communication interface between the virtual machine management server and the switching control apparatus may be an I1 interface.

102. The switching control apparatus sends prestored configuration information to the target forwarding switch corresponding to the identifier of the target forwarding switch, so that the target forwarding switch stores the configuration information.

After the virtual machine migrates to the target physical host in a live manner, the virtual machine can normally access a network only when a target forwarding switch that controls the target physical host needs to have configuration information that is required for the virtual machine to access the network. Therefore, the switching control apparatus needs to send the configuration information that is required for the virtual machine to access the network to the target forwarding switch, so that the target forwarding switch stores the configuration information and the virtual machine normally accesses the network.

103. The switching control apparatus sends a configuration information deletion instruction to the source forwarding switch corresponding to the identifier of the source forwarding switch, so that the source forwarding switch deletes the prestored configuration information.

After the live migration occurs to the virtual machine, if the source forwarding switch of the virtual machine still stores the configuration information of the virtual machine, a network anomaly is caused. Therefore, the switching control apparatus may send the configuration information deletion instruction to the source forwarding switch corresponding to the identifier of the source forwarding switch, so that the source forwarding switch deletes the prestored configuration information.

The configuration information may include: a media access control (MAC, Media Access Control) address, an Internet protocol (IP, Internet Protocol) address, and the like. Specific content of the configuration information may be shown in the form of a dynamic host configuration protocol snooping (DHCP SNOOPING, Dynamic Host Configuration Protocol SNOOPING) binding table. Content in the DHCP SNOOPING binding table may be sent when the configuration information is sent.

In this embodiment of the present disclosure, after a message of live migration that a virtual machine migrates from a source physical host to a target physical host sent by a virtual machine management server is received, an identifier of a source forwarding switch of the virtual machine and an identifier of a target forwarding switch of the virtual machine are acquired; prestored configuration information is sent to the target forwarding switch corresponding to the identifier of the target forwarding switch, so that the target forwarding switch stores the configuration information; and a configuration information deletion instruction is sent to the source forwarding switch corresponding to the identifier of the source forwarding switch, so that the source forwarding switch deletes the prestored configuration information. Compared with the prior art in which configuration information is not migrated synchronously after live migration of a virtual machine, with the method for migrating configuration information during live migration of a virtual machine provided in this embodiment of the present disclosure, configuration information of a virtual machine can be migrated synchronously during live migration of the virtual machine. In this way, when the virtual machine is online on a new physical host, it is not identified as an Internet protocol/media access control address forgery attack, thereby enabling the virtual machine to access a network successfully after the live migration.

Optionally, based on the embodiment corresponding to FIG. 1, in another embodiment of the method for migrating configuration information during live migration of a virtual machine provided in this embodiment of the present disclosure, the message of the live migration carries an identifier of the virtual machine to which the live migration occurs and an identifier of the target physical host to which the virtual machine migrates, and the acquiring an identifier of a source forwarding switch of the virtual machine and an identifier of a target forwarding switch of the virtual machine specifically includes:

determining the identifier of the source forwarding switch according to the identifier of the virtual machine; and determining the identifier of the target forwarding switch according to the identifier of the target physical host.

In this embodiment of the present disclosure, the switching control apparatus may store a mapping table of the identifier of the virtual machine and the identifier of the source forwarding switch and a mapping table of the identifier of the target physical host and the identifier of the target forwarding switch, and correspondence may be determined through the mapping tables.

Optionally, based on the embodiment corresponding to FIG. 1, in another embodiment of the method for migrating configuration information during live migration of a virtual machine provided in this embodiment of the present disclosure, the message of the live migration carries an identifier of the virtual machine to which the live migration occurs and an identifier of a target forwarding switch corresponding to the target physical host to which the virtual machine migrates, and the acquiring an identifier of a source forwarding switch of the virtual machine and an identifier of a target forwarding switch of the virtual machine specifically includes:

determining the identifier of the source forwarding switch according to the identifier of the virtual machine.

Optionally, based on the embodiment corresponding to FIG. 1 and the optional embodiments corresponding to FIG. 1, in another embodiment of the method for migrating configuration information during live migration of a virtual machine provided in this embodiment of the present disclosure:

before the step of receiving a message of live migration that a virtual machine migrates from a source physical host to a target physical host sent by a virtual machine management server, the method further includes:

creating and storing configuration information; and sending the configuration information to the source forwarding switch.

Optionally, based on the embodiment corresponding to FIG. 1 and the optional embodiments corresponding to FIG. 1, in another embodiment of the method for migrating configuration information during live migration of a virtual machine provided in this embodiment of the present disclosure:

before the step of receiving a message of live migration that a virtual machine migrates from a source physical host to a target physical host sent by a virtual machine management server, the method further includes:

receiving and storing configuration information created by the source forwarding switch.

Optionally, based on the embodiment corresponding to FIG. 1 and the optional embodiments corresponding to FIG. 1, in another embodiment of the method for migrating configuration information during live migration of a virtual machine provided in this embodiment of the present disclosure:

before the step of receiving a message of live migration that a virtual machine migrates from a source physical host to a target physical host sent by a virtual machine management server, the method further includes:

receiving configuration information of the virtual machine sent by the virtual machine management server, and sending the configuration information of the virtual machine to the source forwarding switch;

after the step of receiving a message of live migration that a virtual machine migrates from a source physical host to a target physical host sent by a virtual machine management server, the method further includes:

receiving and storing updated configuration information that is sent by the virtual machine management server after the live migration of the virtual machine; and the sending prestored configuration information to the target forwarding switch corresponding to the identifier of the target forwarding switch specifically includes:

sending the updated configuration information to the target forwarding switch.

Figure 2:
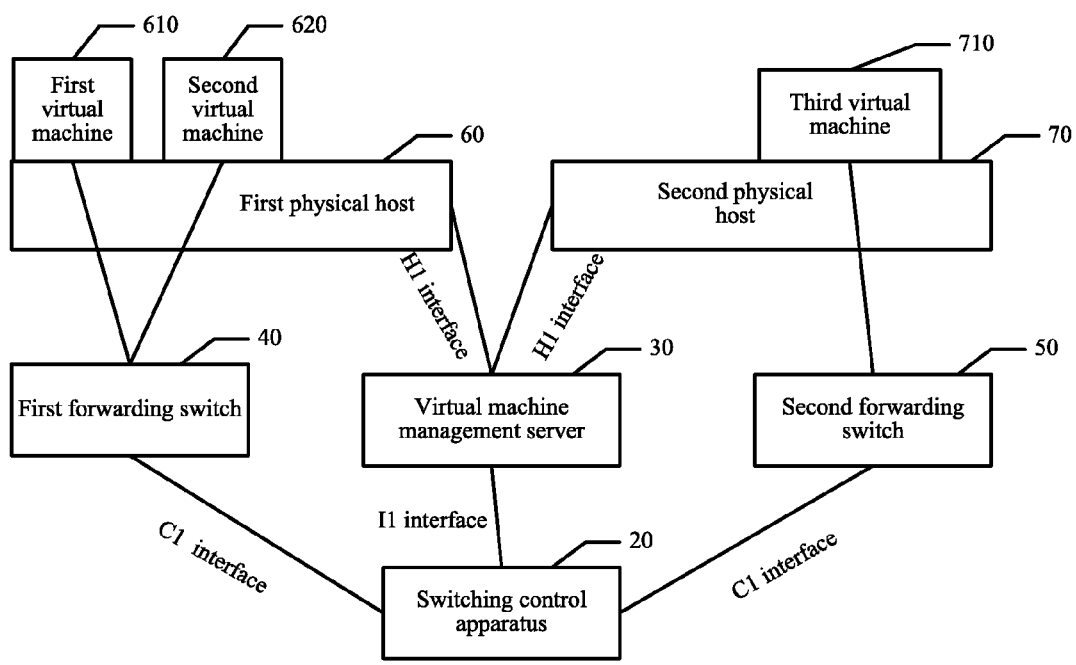
FIG. 2 is a schematic diagram of an embodiment of an application scenario according to the present disclosure.

For ease of understanding, the method for migrating configuration information during live migration of a virtual machine according to this embodiment of the present disclosure is described in detail by taking several specific application scenarios as examples in the following. Details are as follows:

Referring to FIG. 2, a first virtual machine 610 and a second virtual machine 620 run on a first physical host 60, a third virtual machine 710 runs on a second physical host 70, a first forwarding switch 40 stores configuration information that is required for the first virtual machine 610 and the second virtual machine 620 to access a network, a second forwarding switch 50 stores configuration information that is required for the third virtual machine 710 to access a network, a virtual machine management server 30 communicates with the first physical host 60 and the second physical host 70 through H1 interfaces and monitors a live migration situation of a virtual machine through the H1 interfaces, the virtual machine management server 30 communicates with a switching control apparatus 20 through an I1 interface, the virtual machine management server 30 notifies, through the I1 interface, the switching control apparatus 20 of a message indicating that live migration occurs to a virtual machine, and the switching control apparatus 20 communicates with the first forwarding switch 40 and the second forwarding switch 50 through C1 interfaces.

In this embodiment of the present disclosure, it is assumed that live migration occurs to the first virtual machine 610. After detecting a live migration event, the virtual machine management server 30 sends, to the switching control apparatus 20, a message indicating that live migration occurs to the virtual machine 610, and carries an identifier of the virtual machine 610 and an identifier of a target physical host in the message of the live migration. When the target physical host is the second physical host, an identifier of the second physical host 70 is carried. If the virtual machine management server 30 stores a mapping table of a physical host and a forwarding switch, the message of the live migration may directly carry the identifier of the virtual machine 610 and an identifier of a target forwarding switch. The target forwarding switch in this embodiment is the second forwarding switch, and an identifier of the second forwarding switch 50 is carried. After receiving the message of the live migration, the switching control apparatus 20 determines a source forwarding switch as the first forwarding switch and an identifier of the source forwarding switch as an identifier of the first forwarding switch 40 according to the identifier of the virtual machine 610; and determines the identifier of the target forwarding switch as the identifier of the second forwarding switch 50 according to an identifier of the target physical host, that is, the identifier of the second physical host 70. To understand specific procedures of determining the source forwarding switch and the target forwarding switch, reference may be made to Table 1 and Table 2:

TABLE 1

Description of C1 interface parameters stored in a switching control apparatus

| Parameter Name | Function Description |
|---|---|
| MAC address | Multimedia access control address of a virtual machine: This address may be configured when a user uses the virtual machine or specified when an administrator creates the virtual machine. If it is inconsistent with a received packet on a network, MAC address spoofing is identified. |
| IP address | Internet protocol address of the virtual machine: It is dynamically assigned by a DHCP server or statically assigned by a virtual machine management server. If it is inconsistent with a received packet on a network, IP address spoofing is identified. |
| Lease | The DHCP server allocates a subscription duration of an IP address. This entry is automatically released/deleted in the case of timeout. |
| Type | It identifies whether the IP address is dynamically assigned by the DHCP server or statically configured by a virtual management platform. |
| VLAN | A label of a virtual local area network to which a specified virtual machine belongs |
| Port | A number of an interface through which a forwarding switch communicates with a specified virtual machine |
| VM ID | An identifier of the virtual machine: In the case in which the MAC address of the virtual machine is changeable, an ID of the virtual machine may replace the MAC address. |
| Forwarding switch ID | An identifier of a forwarding switch: It identifies a forwarding switch corresponding to a physical host where a specified virtual machine is located (A switching control apparatus determines the forwarding switch ID according to an ID of the physical host.) |
| Port status | Interface status: UP/DOWN/DISABLE. It identifies that a specified interface is in an "up", "down", or "disable" state. |
| Port security | TRUST/UNTRUST. It indicates an interface security attribute defined in DHCP snooping. |

TABLE 2

Description of I1 interface parameters

| Parameter Name | Function Description |
| --- | --- |
| VM ID | An identifier of a virtual machine: In the case in which a MAC address of the virtual machine is changeable, the VM ID replaces the MAC address. |
| MAC address | The MAC address of the virtual machine: This address may be configured when a user uses the virtual machine or specified when an administrator creates the virtual machine. |
| IP address | IP address of the virtual machine: It is dynamically assigned by a DHCP server or statically assigned by a virtual management platform. |
| ID of a source physical host | It identifies which host from which a specified virtual machine migrates. An entry built in a switching control apparatus identifies a mapping between an ID of a source physical host and an ID of a source forwarding switch. |
| ID of a target physical host | It is used to identify which target host into which a specified virtual machine is embedded. An entry built in the switching control apparatus identifies a mapping between an ID of a target physical host and an ID of a target forwarding switch. |

After the source forwarding switch and the target forwarding switch are determined, the stored configuration information is sent to the target forwarding switch, that is, the second forwarding switch 50, so that the second forwarding switch 50 stores the configuration information, and a configuration information deletion instruction is sent to the source forwarding switch, that is, the first forwarding switch 40, so that the first forwarding switch 40 deletes the stored configuration information.

Figure 3:
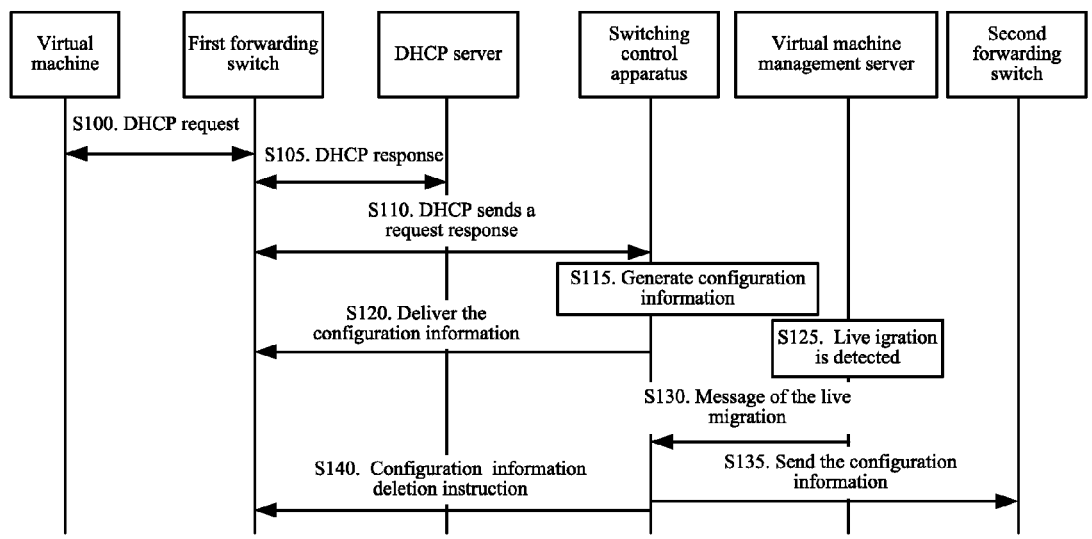
FIG. 3 is a schematic diagram of another embodiment of an application scenario according to the present disclosure.

Referring to FIG. 3, the method for migrating configuration information during live migration of a virtual machine in this embodiment of the present disclosure is described in detail, which is specifically as follows:

S100. A virtual machine sends a dynamic host configuration protocol DHCP request to a first forwarding switch.

S105. The first forwarding switch receives a DHCP response from a DHCP server after forwarding the DHCP request to the DHCP server.

S110. The first forwarding switch synchronizes response time of the DHCP request to a switching control apparatus.

S115. The switching control apparatus generates configuration information of the virtual machine.

S120. The switching control apparatus sends the configuration information to the first forwarding switch for the first forwarding switch to maintain normal running of the virtual machine.

S125. A virtual machine management server detects that live migration occurs to the virtual machine.

S130. The virtual machine management server sends a message of the live migration to the switching control apparatus, where the message of the live migration carries an identifier of the virtual machine and an identifier of a second forwarding switch.

S135. The switching control apparatus sends the configuration information of the virtual machine to the second forwarding switch.

S140. The switching control apparatus sends a configuration information deletion instruction to the first forwarding switch, so as to save memory of the first forwarding switch.

Figure 4:
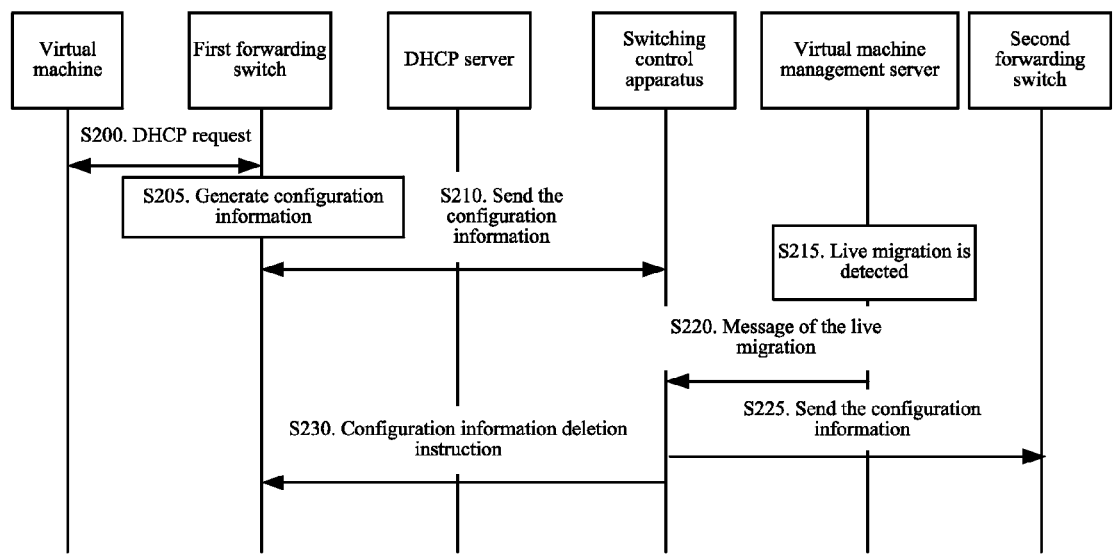
FIG. 4 is a schematic diagram of another embodiment of an application scenario according to the present disclosure.

Referring to FIG. 4, the method for migrating configuration information during live migration of a virtual machine in this embodiment of the present disclosure is described in detail, which is specifically as follows:

S200. A virtual machine sends a dynamic host configuration protocol DHCP request to a first forwarding switch, and the first forwarding switch returns a DHCP response to the virtual machine.

S205. The first forwarding switch generates configuration information of the virtual machine.

S210. The first forwarding switch sends the configuration information of the virtual machine to a switching control apparatus.

S215. A virtual machine management server detects that live migration occurs to the virtual machine.

S220. The virtual machine management server sends a message of the live migration to the switching control apparatus, where the message of the live migration carries an identifier of the virtual machine and an identifier of a second forwarding switch.

S225. The switching control apparatus sends the configuration information of the virtual machine to the second forwarding switch.

S230. The switching control apparatus sends a configuration information deletion instruction to the first forwarding switch, so as to save memory of the first forwarding switch.

Figure 5:
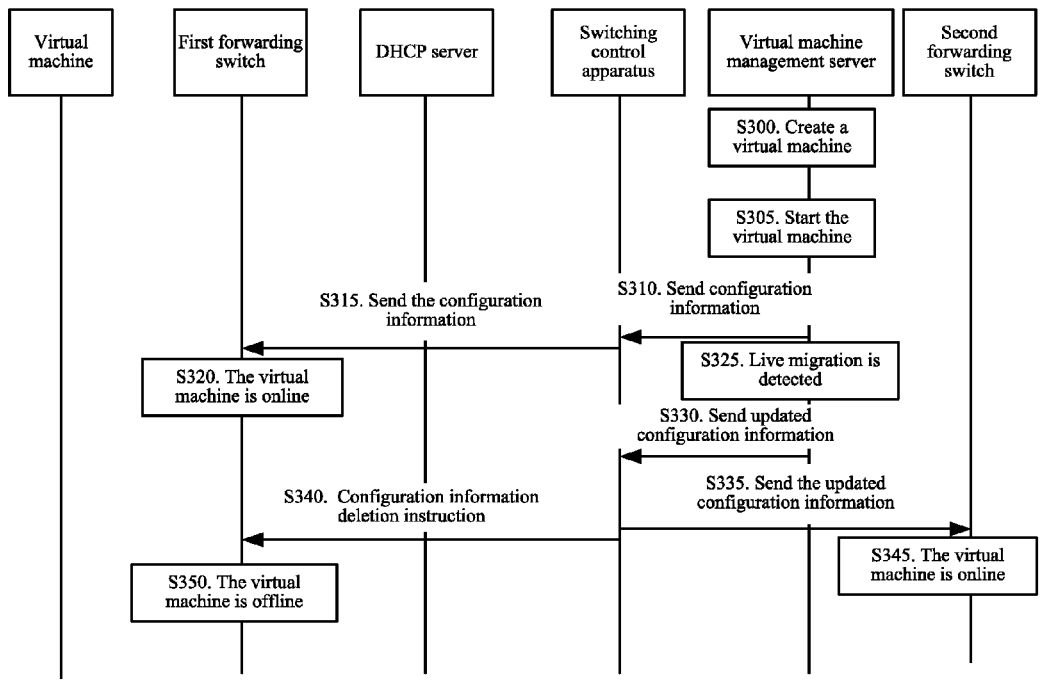
FIG. 5 is a schematic diagram of another embodiment of an application scenario according to the present disclosure.

Referring to FIG. 5, the method for migrating configuration information during live migration of a virtual machine in this embodiment of the present disclosure is described in detail, which is specifically as follows:

S300. A virtual machine management server creates a virtual machine.

S305. The virtual machine management server starts the virtual machine.

S310. The virtual machine management server sends configuration information of the virtual machine to a switching control apparatus.

S315. The switching control apparatus sends the configuration information of the virtual machine to a first forwarding switch.

S320. The virtual machine is online on the first forwarding switch.

S325. The virtual machine management server detects that live migration occurs to the virtual machine.

S330. The virtual machine management server sends updated configuration information of the virtual machine to the switching control apparatus.

S335. The switching control apparatus sends the updated configuration information of the virtual machine to a second forwarding switch.

S340. The switching control apparatus sends a configuration information deletion instruction to the first forwarding switch.

S345. The virtual machine is online on the second forwarding switch.

S350. The virtual machine is offline from the first forwarding switch.

With the method for migrating configuration information during live migration of a virtual machine provided in the foregoing multiple embodiments of the present disclosure, configuration information of a virtual machine can be migrated synchronously during live migration of the virtual machine, thereby enabling the virtual machine to access a network successfully after the live migration.

Figure 6:
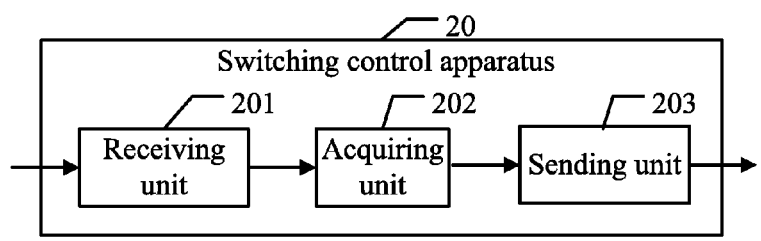
FIG. 6 is a schematic diagram of an embodiment of a switching control apparatus according to the present disclosure.

Referring to FIG. 6, an embodiment of a switching control apparatus provided in an embodiment of the present disclosure includes:

a receiving unit 201, configured to receive a message of live migration that a virtual machine migrates from a source physical host to a target physical host sent by a virtual machine management server;

an acquiring unit 202, configured to acquire an identifier of a source forwarding switch of the virtual machine and an identifier of a target forwarding switch of the virtual machine after the receiving unit 201 receives the message of the live migration of the virtual machine; and a sending unit 203, configured to send prestored configuration information to the target forwarding switch corresponding to the identifier of the target forwarding switch, where the identifier of the target forwarding switch is acquired by the acquiring unit 202, so that the target forwarding switch stores the configuration information; and send a configuration information deletion instruction to the source forwarding switch corresponding to the identifier of the source forwarding switch, so that the source forwarding switch deletes the prestored configuration information.

In this embodiment of the present disclosure, a receiving unit 201 receives a message of live migration that a virtual machine migrates from a source physical host to a target physical host sent by a virtual machine management server; an acquiring unit 202 acquires an identifier of a source forwarding switch of the virtual machine and an identifier of a target forwarding switch of the virtual machine after the receiving unit 201 receives the message of the live migration of the virtual machine; and a sending unit 203 sends prestored configuration information to the target forwarding switch corresponding to the identifier of the target forwarding switch, where the identifier of the target forwarding switch is acquired by the acquiring unit 202, so that the target forwarding switch stores the configuration information; and sends a configuration information deletion instruction to the source forwarding switch corresponding to the identifier of the source forwarding switch, so that the source forwarding switch deletes the prestored configuration information. Compared with the prior art, the switching control apparatus provided in this embodiment of the present disclosure can synchronously migrate configuration information of a virtual machine during live migration of the virtual machine. In this way, when the virtual machine is online on a new physical host, it is not identified as an Internet protocol/media access control address forgery attack, thereby enabling the virtual machine to access a network successfully after the live migration.

Optionally, based on the embodiment corresponding to FIG. 6, in another embodiment of the switching control apparatus provided in this embodiment of the present disclosure, the message of the live migration carries an identifier of the virtual machine to which the live migration occurs and an identifier of the target physical host to which the virtual machine migrates, and the acquiring unit 202 is specifically configured to determine the identifier of the source forwarding switch according to the identifier of the virtual machine and determine the identifier of the target forwarding switch according to the identifier of the target physical host.

Optionally, based on the embodiment corresponding to FIG. 6, in another embodiment of the switching control apparatus provided in this embodiment of the present disclosure, the message of the live migration carries an identifier of the virtual machine to which the live migration occurs and an identifier of a target forwarding switch corresponding to the target physical host to which the virtual machine migrates, and the acquiring unit is specifically configured to determine the identifier of the source forwarding switch according to the identifier of the virtual machine.

Figure 7:
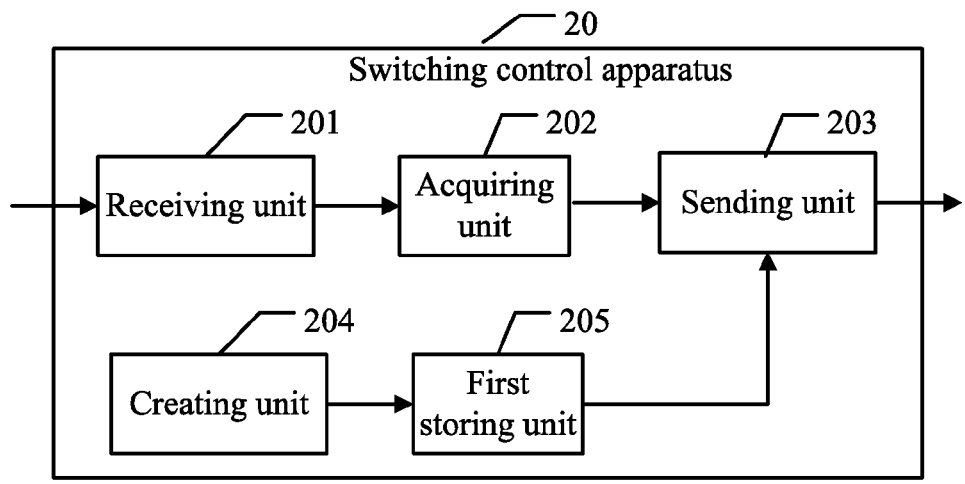
FIG. 7 is a schematic diagram of another embodiment of a switching control apparatus according to the present disclosure.

Optionally, based on the embodiment corresponding to FIG. 6, referring to FIG. 7, another embodiment of the switching control apparatus provided in this embodiment of the present disclosure further includes: a creating unit 204 and a first storing unit 205, where:

the creating unit 204 is configured to create configuration information;

the first storing unit 205 is configured to store the configuration information created by the creating unit 204; and the sending unit 203 is further configured to send, to the source forwarding switch, the configuration information stored by the first storing unit 205.

Figure 8:
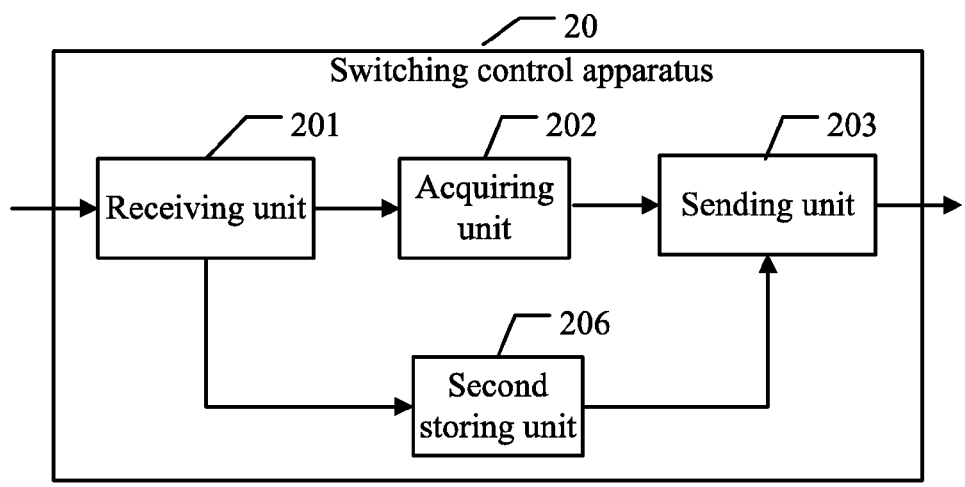
FIG. 8 is a schematic diagram of another embodiment of a switching control apparatus according to the present disclosure.

Optionally, based on the embodiment corresponding to FIG. 6, referring to FIG. 8, another embodiment of the switching control apparatus provided in this embodiment of the present disclosure further includes: a second storing unit 206, where:

the receiving unit 201 is further configured to receive configuration information created by the source forwarding switch; and the second storing unit 206 is configured to store the configuration information received by the receiving unit 201.

Figure 9:
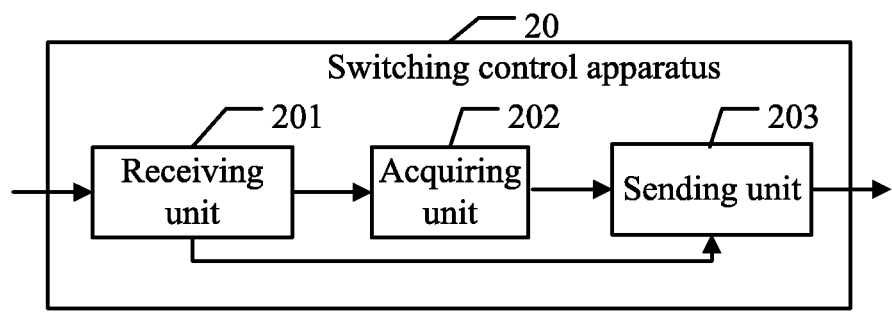
FIG. 9 is a schematic diagram of another embodiment of a switching control apparatus according to the present disclosure.

Optionally, based on the embodiment shown in FIG. 6, referring to FIG. 9, in another embodiment of the switching control apparatus provided in this embodiment of the present disclosure:

the receiving unit 201 is further configured to receive configuration information of the virtual machine sent by the virtual machine management server; and the sending unit 203 is further configured to send, to the source forwarding switch, the configuration information of the virtual machine received by the receiving unit 201.

An embodiment of the present disclosure further provides a computer storage medium, where the computer storage medium stores a program, and when the program is executed, a part or all of the steps in the method for migrating configuration information during live migration of a virtual machine are performed.

Figure 10:
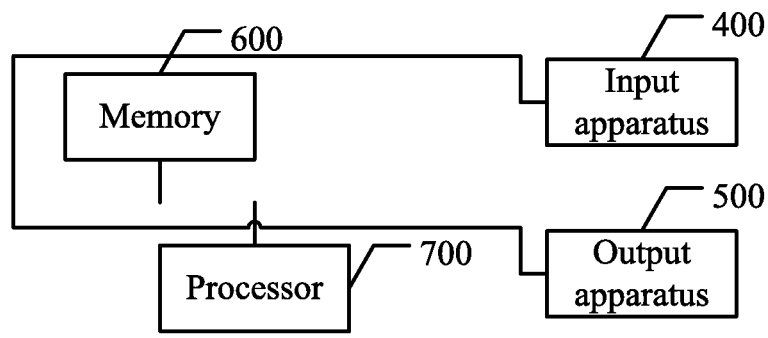
FIG. 10 is a schematic diagram of an embodiment of a switching control device according to the present disclosure.

Referring to FIG. 10, an embodiment of the present disclosure further provides a switching control device, including: an input apparatus 400, an output apparatus 500, a memory 600, and a processor 700, where:

the input apparatus 400, the output apparatus 500, the memory 600, and the processor 700 are connected through a bus or in another manner;

the input apparatus 400 is configured to receive a message of live migration that a virtual machine migrates from a source physical host to a target physical host sent by a virtual machine management server;

the processor 700 is configured to acquire an identifier of a source forwarding switch of the virtual machine and an identifier of a target forwarding switch of the virtual machine; and the output apparatus 500 is configured to send prestored configuration information to the target forwarding switch corresponding to the identifier of the target forwarding switch, so that the target forwarding switch stores the configuration information; and send a configuration information deletion instruction to the source forwarding switch corresponding to the identifier of the source forwarding switch, so that the source forwarding switch deletes the prestored configuration information.

In some embodiments of the present disclosure, the message of the live migration carries an identifier of the virtual machine to which the live migration occurs and an identifier of the target physical host to which the virtual machine migrates, and the processor 700 is configured to determine the identifier of the source forwarding switch according to the identifier of the virtual machine and determine the identifier of the target forwarding switch according to the identifier of the target physical host.

In some embodiments of the present disclosure, the message of the live migration carries an identifier of the virtual machine to which the live migration occurs and an identifier of a target forwarding switch corresponding to the target physical host to which the virtual machine migrates, and the processor 700 is configured to determine the identifier of the source forwarding switch according to the identifier of the virtual machine.

In some embodiments of the present disclosure, the processor 700 is further configured to create configuration information;

the memory 600 is further configured to store the configuration information; and the output apparatus 500 is further configured to send the configuration information to the source forwarding switch.

In some embodiments of the present disclosure, the input apparatus 400 is further configured to receive configuration information created by the source forwarding switch; and the memory 600 is further configured to store the configuration information.

In some embodiments of the present disclosure, the input apparatus 400 is further configured to receive configuration information of the virtual machine sent by the virtual machine management server; and the output apparatus 500 is further configured to send the configuration information of the virtual machine to the source forwarding switch.

In some embodiments of the present disclosure, the input apparatus 400 is further configured to receive updated configuration information that is sent by the virtual machine management server after the live migration of the virtual machine; and the output apparatus 500 is further configured to send the updated configuration information to the target forwarding switch.

Figure 11:
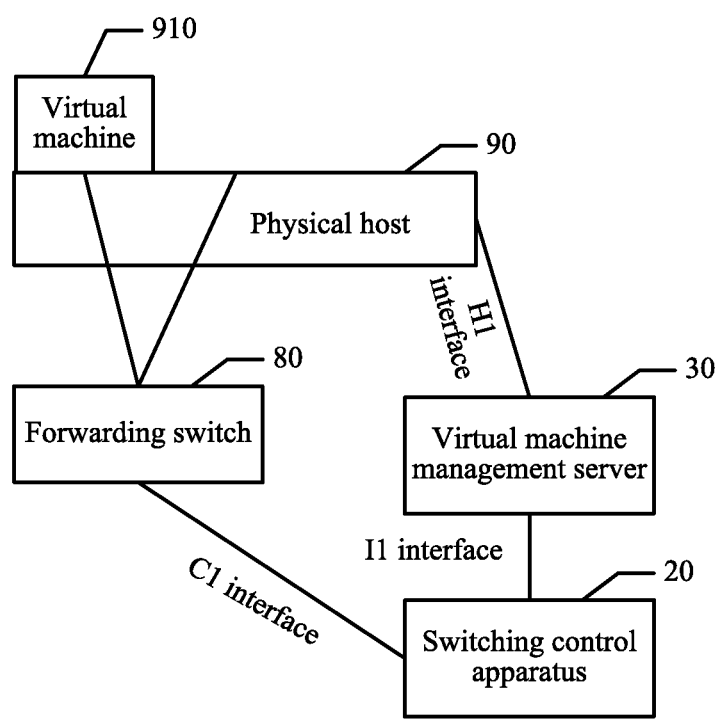
FIG. 11 is a schematic diagram of an embodiment of a virtual system according to the present disclosure.

Referring to FIG. 11, an embodiment of a virtual network system provided in an embodiment of the present disclosure includes: a virtual machine 910, a physical host 90, a forwarding switch 80, a virtual machine management server 30, and a switching control apparatus 20, where the physical host 90 communicates with the virtual machine management server 30 through an H1 interface, the forwarding switch 80 communicates with the switching control apparatus 20 through a C1 interface, and the virtual machine management server 30 communicates with the switching control apparatus 20 through an I1 interface;

the virtual machine 910 runs on the physical host 90, the virtual machine management server 30 manages the virtual machine 910, and the forwarding switch 80 supports running of the virtual machine; and the switching control apparatus 20 is configured to receive a message of live migration that the virtual machine migrates from a source physical host to a target physical host sent by the virtual machine management server, and acquire an identifier of a source forwarding switch of the virtual machine and an identifier of a target forwarding switch of the virtual machine; send prestored configuration information to the target forwarding switch corresponding to the identifier of the target forwarding switch, so that the target forwarding switch stores the configuration information; and send a configuration information deletion instruction to the source forwarding switch corresponding to the identifier of the source forwarding switch, so that the source forwarding switch deletes the prestored configuration information.

With the system provided in this embodiment of the present disclosure, configuration information of a virtual machine can be migrated synchronously during live migration of the virtual machine. In this way, when the virtual machine is online on a new physical host, it is not identified as an Internet protocol/media access control address forgery attack, thereby enabling the virtual machine to access a network successfully after the live migration.

Persons of ordinary skill in the art may understand that all or a part of the steps of the methods in the foregoing embodiments may be implemented by a program instructing relevant hardware. The program may be stored in a computer readable storage medium. The storage medium may include a ROM, a RAM, a magnetic disk, or an optical disk.

The method, apparatus, and system for migrating configuration information during live migration of a virtual machine provided in the embodiments of the present disclosure are described in detail in the foregoing. Specific examples are used for describing principles and implementation manners of the present disclosure in this specification. The foregoing description about the embodiments is merely for helping understand the methods and core ideas of the present disclosure. Meanwhile, persons skilled in the art may make variations to the specific implementation manners and application scopes according to the ideas of the present disclosure. In conclusion, the content of this specification shall not be construed as a limitation on the present disclosure.

What is claimed is:

1. A method for migrating configuration information during live migration of a virtual machine, the method comprising:

after receiving a message of live migration indicating that a virtual machine is migrated from a source physical host to a target physical host sent by a virtual machine management server, acquiring, by a switching control apparatus, an identifier of a source forwarding switch of the virtual machine and an identifier of a target forwarding switch of the virtual machine according to the message;

sending, by the switching control apparatus, configuration information to the target forwarding switch corresponding to the identifier of the target forwarding switch, so that the target forwarding switch stores the configuration information; and sending, by the switching control apparatus, a configuration information deletion instruction to the source forwarding switch corresponding to the identifier of the source forwarding switch instructing the source forwarding switch to delete the configuration information.

2. The method according to claim 1, wherein the message of the live migration carries an identifier of the virtual machine to which the live migration occurs and an identifier of the target physical host to which the virtual machine migrates; and wherein acquiring the identifier of a source forwarding switch of the virtual machine and the identifier of the target forwarding switch of the virtual machine comprises:

determining the identifier of the source forwarding switch according to the identifier of the virtual machine; and determining the identifier of the target forwarding switch according to the identifier of the target physical host.

3. The method according to claim 1, wherein the message of the live migration carries an identifier of the virtual machine to which the live migration occurs and an identifier of a target forwarding switch corresponding to the target physical host to which the virtual machine migrates, and wherein acquiring the identifier of the source forwarding switch of the virtual machine comprises determining the identifier of the source forwarding switch according to the identifier of the virtual machine.

4. The method according to claim 1, wherein, before receiving the message of the live migration indicating that a virtual machine is migrated from a source physical host to a target physical host sent by a virtual machine management server, the method further comprises:
  creating and storing configuration information; and
  sending the configuration information to the source forwarding switch.

5. The method according to claim 1, wherein, before receiving the message of the live migration, the method further comprises:
  receiving and storing configuration information created by the source forwarding switch.

6. The method according to claim 1, wherein, before receiving the message of the live migration, the method further comprises:
  receiving configuration information of the virtual machine sent by the virtual machine management server; and
  sending the configuration information of the virtual machine to the source forwarding switch.

7. The method according to claim 6, wherein, after receiving the message of the live migration, the method further comprises receiving and storing updated configuration information that is sent by the virtual machine management server after the live migration of the virtual machine; and
  wherein sending the configuration information to the target forwarding switch corresponding to the identifier of the target forwarding switch specifically comprises sending the updated configuration information to the target forwarding switch.

8. A non-transitory computer-readable storage medium with an executable program stored thereon, wherein the program instructs a processor of a switching control apparatus to perform the following steps:
  after receiving a message of live migration indicating that a virtual machine is migrated from a source physical host to a target physical host sent by a virtual machine management server, acquiring an identifier of a source forwarding switch of the virtual machine and an identifier of a target forwarding switch of the virtual machine according to the message;
  sending configuration information to the target forwarding switch corresponding to the identifier of the target forwarding switch, so that the target forwarding switch stores the configuration information; and
  sending a configuration information deletion instruction to the source forwarding switch corresponding to the identifier of the source forwarding switch, so that the source forwarding switch deletes the configuration information.

9. The computer storage medium according to claim 8, wherein, before the step of receiving the message of the live migration that a virtual machine is migrated from a source physical host to a target physical host sent by a virtual machine management server, the program instructs the processor to perform the steps of:
  creating and storing configuration information; and
  sending the configuration information to the source forwarding switch.

10. The computer storage medium according to claim 8, wherein, before the step of receiving the message of the live migration that a virtual machine is migrated from a source physical host to a target physical host sent by a virtual machine management server, the program instructs the processor to perform the steps of:
  receiving and storing configuration information created by the source forwarding switch.

11. The computer storage medium according to claim 8, wherein, before the step of receiving the message of the live migration that a virtual machine is migrated from a source physical host to a target physical host sent by a virtual machine management server, the program instructs the processor to perform the steps of:
  receiving configuration information of the virtual machine sent by the virtual machine management server; and
  sending the configuration information of the virtual machine to the source forwarding switch.

12. The computer storage medium according to claim 11, wherein, after the step of receiving the message of the live migration that a virtual machine is migrated from a source physical host to a target physical host sent by a virtual machine management server, the program instructs the processor to perform the steps of:
  receiving and storing updated configuration information that is sent by the virtual machine management server after the live migration of the virtual machine; and
  wherein the step of sending configuration information to the target forwarding switch corresponding to the identifier of the target forwarding switch comprises sending the updated configuration information to the target forwarding switch.

13. A switching control device, comprising:
  an input apparatus, configured to receive a message of live migration indicating that a virtual machine is migrated from a source physical host to a target physical host sent by a virtual machine management server;
  a processor, configured to acquire an identifier of a source forwarding switch of the virtual machine and an identifier of a target forwarding switch of the virtual machine according to the message;
  a memory coupled to the processor; and
  an output apparatus, configured to send configuration information to the target forwarding switch corresponding to the identifier of the target forwarding switch, so that the target forwarding switch stores the configuration information and to send a configuration information deletion instruction to the source forwarding switch corresponding to the identifier of the source forwarding switch, so that the source forwarding switch deletes the configuration information.

14. The switching control device according to claim 13, wherein the message of the live migration carries an identifier of the virtual machine to which the live migration occurs and an identifier of the target physical host to which the virtual machine migrates; and
  wherein the processor is configured to determine the identifier of the source forwarding switch according to the identifier of the virtual machine and determine the identifier of the target forwarding switch according to the identifier of the target physical host.

15. The switching control device according to claim 13, wherein the message of the live migration carries an identifier of the virtual machine to which the live migration occurs and an identifier of a target forwarding switch corresponding to the target physical host to which the virtual machine migrates; and
  wherein the processor is configured to determine the identifier of the source forwarding switch according to the identifier of the virtual machine.

16. The switching control device according to claim 13, wherein: the processor is further configured to create configuration information;
  the memory is configured to store the configuration information; and the output apparatus is further configured to send the configuration information to the source forwarding switch.

17. The switching control device according to claim 13, wherein: the input apparatus is further configured to receive configuration information created by the source forwarding switch; and the memory is configured to store the configuration information.

18. The switching control device according to claim 13, wherein: the input apparatus is further configured to receive configuration information of the virtual machine sent by the virtual machine management server, and the output apparatus is further configured to send the configuration information of the virtual machine to the source forwarding switch.

19. The switching control device according to claim 18, wherein: the input apparatus is further configured to receive updated configuration information that is sent by the virtual machine management server after the live migration of the virtual machine; and the output apparatus is further configured to send the updated configuration information to the target forwarding switch.

\* \* \* \* \*